United States Patent
Ericson et al.

(10) Patent No.: US 8,045,994 B2
(45) Date of Patent: Oct. 25, 2011

(54) ADJUSTING THE TARGETED NUMBER OF TRANSMISSION ATTEMPTS

(75) Inventors: Mårten Ericson, Luleå (SE); Kjell Larsson, Luleå (SE); Peter Ökvist, Luleå (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 371 days.

(21) Appl. No.: 12/514,006

(22) PCT Filed: Nov. 30, 2006

(86) PCT No.: PCT/SE2006/050528
§ 371 (c)(1),
(2), (4) Date: May 7, 2009

(87) PCT Pub. No.: WO2008/066433
PCT Pub. Date: Jun. 5, 2008

(65) Prior Publication Data
US 2009/0280822 A1    Nov. 12, 2009

(51) Int. Cl.
*H04W 72/00* (2009.01)
(52) U.S. Cl. .................................. 455/452.2; 455/453
(58) Field of Classification Search .............. 455/450, 455/452.1, 452.2, 453, 516, 517
See application file for complete search history.

(56) References Cited

U.S. PATENT DOCUMENTS

| 6,374,112 B1 * | 4/2002 | Widegren et al. | 455/452.2 |
| 7,929,512 B2 * | 4/2011 | Malomsoky et al. | 455/453 |

FOREIGN PATENT DOCUMENTS

WO     2006085174 A1    8/2006

OTHER PUBLICATIONS

Miyazaki, A. et al. "RTP Payload Format to Enable Multiple Selective Retransmissions", Audio/Video Transport Working Group, Internet Draft, Jul. 14, 2000, retrieved from the Internet: http://citeseer.ist.psu.edu/cache/papers/cs/16614/ftp:zSzzSzftp.isi.eduzSzinternet-draftszSzdraft-miyazaki-avt-rtp-selret-01.pdf/miyazaki00rtp.pdf.
Vacirca, F. et al. "On the effects of ARQ mechanisms on TCP performance in wireless environments", IEEE Global Telecommunications Conference, 2003. Dec. 1-5, 2003, ISBN: 0-7803-7974-8/03, INSPEC AN 8220025.
Ericsson: "HARQ Retransmission and Failure Indication for improved Outer loop power control"; R3-041503, 3GPP TSG RAN WG3 Meeting #45, Nov. 15-19, 2004. Retrieved from the Internet at: http://www.3gpp.org/ftp/tsg_ran/WG3_Iu/TSGR3_45/Docs/R3-041503.zip.
PCT International Search Report, mailed Oct. 24, 2007, in connection with International Application No. PCT/SE2006/050528.
PCT International Preliminary Report on Patentability, mailed Dec. 16, 2008, in connection with International Application No. PCT/SE2006/050528.

* cited by examiner

*Primary Examiner* — Quochien B Vuong
(74) *Attorney, Agent, or Firm* — Potomac Patent Group PLLC

(57) ABSTRACT

The invention is directed towards a method and transmission attempt determining device for adjusting the targeted number of transmission attempts in uplink communications between mobile stations and a cell in a wireless network handled by a cell handling device. According to the invention measurement data (RC) of radio conditions and service requirement data (SR) of the uplinks for mobile stations are obtained (36, 38, 40). Based on this data a determination (42) is made if the targeted number of transmission attempts should be adjusted. If a change should be made (42) an increase or a decrease is then determined (44) and the targeted number of transmission attempts are adjusted in the selected direction (46).

15 Claims, 4 Drawing Sheets

ADJUSTING THE TARGETED NUMBER OF TRANSMISSION ATTEMPTS

TECHNICAL FIELD OF THE INVENTION

The present invention relates to the field of mobile station power control and resource management in wireless networks. The invention more particularly relates to a method of adjusting the targeted number of transmission attempts in uplink communications between at least one first group of mobile stations including at least one mobile station and a cell in a wireless network handled by a cell handling device as well as to a transmission attempt determining device for a cell in a wireless network that is handled by a cell handling device, which cell handling device handles communication with at least one first group of mobile stations including at least one mobile station.

DESCRIPTION OF RELATED ART

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the mobile user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto.

One example of a radio access network is the Universal Mobile Telecommunications (UMTS) Terrestrial Radio Access Network (UTRAN). The UMTS is a third generation system which in some respects builds upon the radio access technology known as Global System for Mobile communications (GSM). UTRAN is essentially a radio access network providing wideband code division multiple access (WCDMA) to user equipment units (UEs). The Third Generation Partnership Project (3GPP) has undertaken to evolve further the UTRAN and GSM-based radio access network technologies.

In a WCDMA system there are basically two types of power control algorithms; inner and outer-loop power. The inner-loop power control, which is fast, adjusts the transmit power of a sending entity towards a specific signal-to-carrier ratio (SIR) target at a receiving entity, whereas the outer-loop power control (OLPC), which is slow, adjusts the SIR target of the inner loop power control in order to maintain a specified quality-based target. In the uplink, i.e. from mobile station to base station, OLPC is used both for DCH (Dedicated Channel) and E-DCH (Enhanced Data Channel) channels, but in a slightly different manner. Due to the use of HARQ (Hybrid Automatic Repeat Request) protocol in EUL (Enhanced Uplink), the currently used OLPC quality target is the number of transmission attempts.

It is expected that EUL will eventually replace ordinary so-called R99 uplink solutions, at least in hot spots. Such examples might be that VoIP (Voice over IP) replaces CS (Circuit-Switched) speech and that services requiring higher bit rates are/will be deployed on E-DCH instead of R99 DCHs. However, to make this scenario happen, the capacity and coverage for e.g. a VoIP solution must be equally efficient as CS speech, and higher bit rate services deployed on EUL must outperform their R99 counterparts.

For some radio access bearer realizations in 3GPP ($3^{rd}$ Generation Partnership Project) WCDMA (Wideband Code Division Multiple Access) systems, such as E-DCH and HS-DSCH (High Speed Downlink Shared Channel), HARQ protocols are used to improve the link layer performance. The HARQ protocol enables many transmission attempts to be used to transmit one data block. Using many transmission attempts, a delay will be added to the total end-to-end delay for the transmission of the data block. Depending on the service type and the corresponding delay requirements, such extra delay might be considerable. However, it is possible to target different number of transmission attempts, and by using fewer transmission attempts, a shorter delay will be experienced. This means that few transmission attempts are desirable for delay sensitive services such as VoIP.

However, for the time being, irrespectively of the rather different radio conditions, the state of the art is to use a static transmission attempt target value within the entire cell, e.g. the same transmission attempt target value for all users in the cell. The problem with this is that the network does not adapt to different conditions in the cell, i.e. it is not using the scarce UE uplink power efficiently and/or adapts to the uplink interference, and in the end wastes system capacity and/or provides a lower quality than necessary. Hence, a compromise is needed to provide good enough coverage, user throughput and delay.

Further on, the current OLPC concept is not flexible enough to handle different services with different delay and bit rate requirements for various radio conditions and cell deployments.

To summarize: According to the state of the art the transmission attempt target is fixed for each radio bearer (e.g. the Interactive, VoIP).

This means that:
If high transmission attempt target:
More retransmissions
Higher delay
More HARQ gain
Higher capacity
Possibly more stable system
If low transmission attempt target:
Fast SIR target increase
Fewer retransmissions
Less HARQ gain
Lower delay
Lower capacity There is therefore a need for an improvement in the field of transmission attempts.

SUMMARY OF THE INVENTION

The present invention is therefore directed towards providing an improved and flexible determination of the targeted number of transmission attempts by mobile stations communicating with a cell handling device in a wireless network.

This is generally solved through obtaining measurement data of radio conditions and service requirement data of the uplinks for mobile stations. Based on this data a determination is made concerning if the targeted number of transmission attempts should be adjusted. If a change should be made an increase or a decrease is then determined and the targeted number of transmission attempts are adjusted in the selected direction.

One object of the present invention is thus to provide a method of adjusting the targeted number of transmission attempts in uplink communications between at least one first group of mobile stations including at least one mobile station and a cell in a wireless network, which method provides an improved and flexible determination of the targeted number of transmission attempts.

This object is according to a first aspect of the present invention achieved through a method of adjusting the targeted number of transmission attempts in uplink communications between at least one first group of mobile stations including at least one mobile station and a cell in a wireless network. The method includes the steps: obtaining measurement data of the radio conditions of the uplinks between the mobile stations of the group and said cell, obtaining service requirement data for mobile stations of this group and determining, based on the obtained data, whether the targeted number of transmission attempts that can be made by mobile stations in the group should be adjusted or not in order to obtain a desired link quality for each uplink connection. In case the determination indicates that an adjustment should be made it is then determined, based on the obtained data, if an increase or a decrease of the targeted number of transmission attempts should be made, and then the targeted number of transmission attempts are adjusted in the direction of this latter determination.

Another object of the present invention is to provide a transmission attempt determining device for a cell in a wireless network that is handled by a cell handling device, which device provides an improved and flexible determination of the targeted number of transmission attempts.

This object is according to a second aspect of the present invention achieved through a transmission attempt determining device for a cell in a wireless network, where at least one first group of mobile stations including at least one mobile station is communicating with the cell. The transmission attempt determining device comprises a radio condition measurement obtaining unit configured to obtain measurement data of the radio conditions of the uplinks between the mobile stations of the group and said cell, a service requirement obtaining unit configured to obtain service requirement data for mobile stations of said group, and a transmission attempt determining unit. The transmission attempt determining unit is here configured to determine, based on the obtained data, whether the targeted number of transmission attempts that can be made by mobile stations in the group should be adjusted or not in order to obtain a desired link quality for each uplink connection. In case the determination indicates that an adjustment should be made it furthermore determines, based on the obtained data, if an increase or a decrease of the targeted number of transmission attempts should be made and supplies a control signal indicative of the determined targeted number of attempts.

The present invention has many advantages. It provides a flexible way of determining how many transmission attempts are to be provided to a mobile station. This may furthermore be done according to each single mobile station, according to different groups of mobile stations, where a group can be based on service requirements and type of communication, or for all mobile stations, The invention allows several different aspects to be considered, like cell load, power used, distance to cell handling device, desirable bit rate and delay.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

The present invention is directed towards providing differentiated targeted numbers of transmission attempts in a cell of a wireless network, like a wide area network in the form of a WCDMA network.

As mentioned above, in order to obtain a link quality, which is here provided in the form of a signal-to-carrier ratio (SIR), the current practice is to set a more or less fixed targeted number of transmission attempts, also denoted TA target, for a cell. This is impractical, because nowadays there are different services provided that have different requirements regarding for instance bit rate and delay. This means that it would be beneficial to provide different such targets for different types of services. Further information that it would be advantageous to consider are the load of the cell, i.e. how many mobile stations are communicating with a cell, transmission power, where in a cell a mobile station may be provided as well as the service requirements of the mobile station. All these different aspects give rise to situations where it would be profitable to use differentiated targets.

Figure 1:
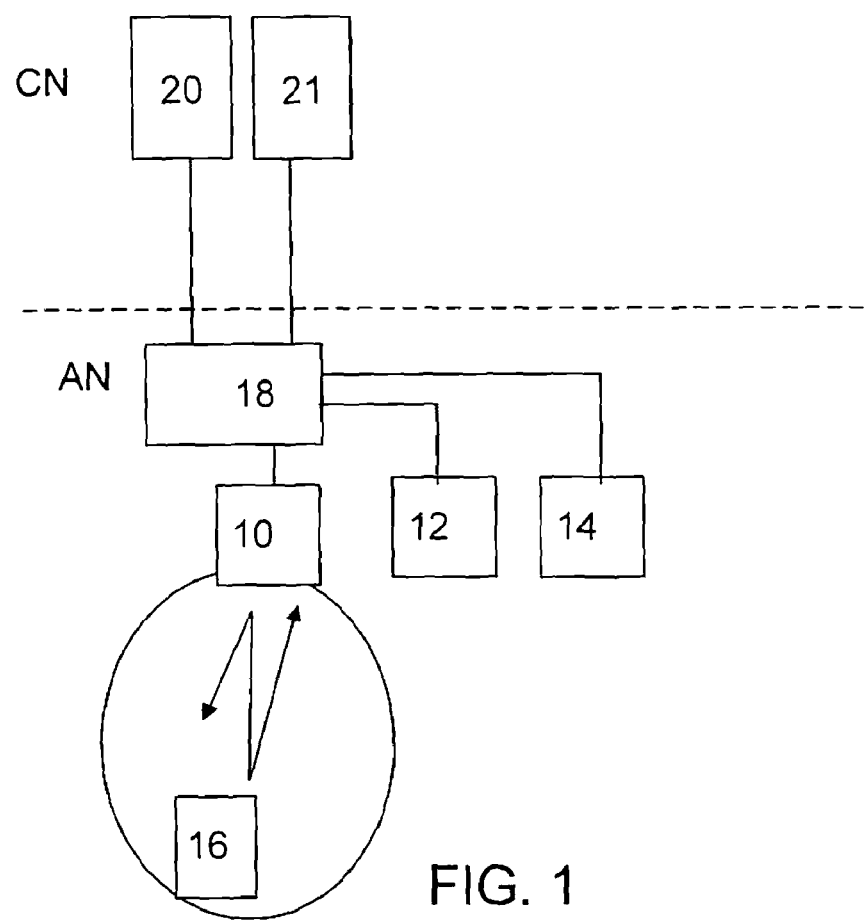
FIG. 1 schematically shows an access network connected to a core network as well as a mobile station connected to a cell handled by a cell handling device of the access network.

The present invention will now be described in more detail in the non-limiting, example context of a Universal Mobile Telecommunications (UMTS) network shown in FIG. 1. A core network CN has a first connection-oriented service node 20, which may be a Mobile Switching Centre (MSC) that provides circuit-switched services. The core network CN also includes a second General Packet Radio Service (GPRS) node 21 tailored to provide packet-switched type services, which is sometimes referred to as the serving GPRS service node (SGSN). The service node 20 may be connected to circuit switched networks such as PSTN (Public Switched Telephone Network) or GSM (Global System for Mobile communication). The node 21 may be connected to connectionless-oriented networks such as the Internet.

Each of the core network service nodes 20 and 21 connects to an access network AN, which is here a UMTS Terrestrial Radio Access Network (UTRAN). UTRAN AN includes one or more radio network controllers (RNC), where only one RNC 18 is shown in FIG. 1. The RNC 18 is connected to a plurality of cells. The RNC 18 is connected to a first cell handling device 10, a second cell handling device 12 and a third cell handling device 14. Each of these cell handling devices 10, 12 and 14 control communication within a cell. Here it should be realised that one cell handling device may handle more than one cell. In the figure only a cell associated with the first cell handling device 10 is shown. The cells are provided in a geographical area covered by the access network AN. The cell handling devices are within these types of networks base stations. In FIG. 1 one user equipment unit in the form of a mobile station 16 is shown in the cell handled by the base station 10 in the access network AN and shown as communicating with this base station 10. It should be realised that normally there may be provided several mobile stations communicating with a base station.

Figure 2:
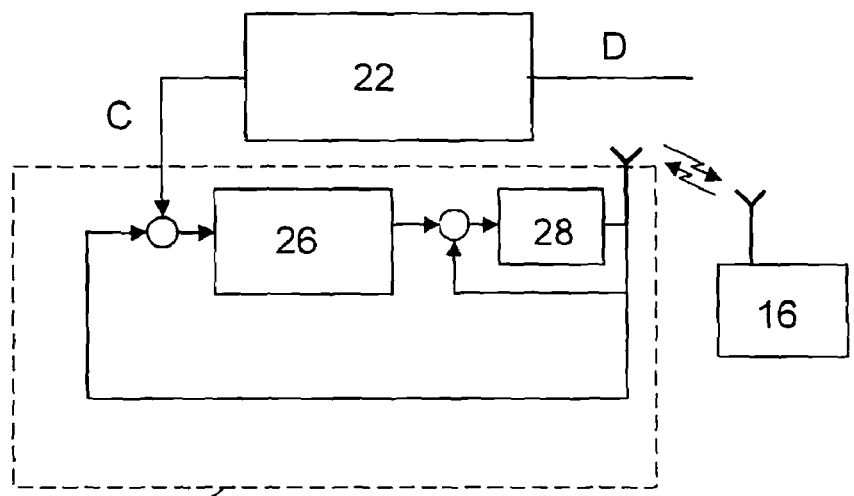
FIG. 2 shows a block schematic of a transmission attempt determining device according to the present invention being connected to a cell handling device.

FIG. 2 shows a block schematic of a transmission attempt determining device 22 according to the present invention being connected to a base station 10 (indicated with a dashed box). In the drawing only the parts of the base station 10 that are relevant to the present invention are shown. It should be realised that it may include several more entities than the ones shown and to be described here. The base station 10 includes one or more antennas for communicating with the mobile station 16. However in the figure there is only shown one such antenna. This antenna is connected to an output of an inner-loop power control unit 28, which has an input that in turn is connected to an output of a SIR-filtering device 26 via a first adding element. The SIR-filtering device is in this case in the form of an outer-loop power control unit 26. The antenna is also connected to this first adding element. The input of the outer loop power control unit 26 is in turn connected to a second adding element. The antenna is also connected to this second adding element. The second adding element is furthermore connected to the output of the transmission attempt determining device 22 according to the present invention, which supplies a control signal C to this second adding element. The transmission attempt determining unit 22 furthermore has an input on which it receives input data D that is used for adjusting transmission attempts in line with the principles of the present invention. This data D is normally obtained from the base station 10, which in turn may receive most of this data from the different mobile stations 16 connected to it. However some may also be received from the radio network controller of FIG. 1 or the base station 10 may gather some of it itself. The outer-loop power control unit has been described as being provided in the base station 10. However, it may just as well be provided in the radio network controller. As an alternative to OLPC it is also possible to perform some kind of suitable SIR-filtering (signal-to-carrier ratio).

In operation the inner-loop power control unit 28 adjusts the transmit power of the sender towards a specific link quality target at the receiver. The link quality is here provided in the form of a signal-to-carrier ratio (SIR). The outer-loop power control unit (OLPC) 26 adjusts the SIR target of the inner loop power control unit 28 in order to maintain a specified quality-based target. The outer-loop power control for uplink channels adjusts the uplink SIR-target so that a given quality target is fulfilled. The quality target is the fraction of blocks that is expected to need more than targeted TAs to be successfully decoded. If a block is correctly decoded by the base station and the used number of transmission attempts is higher than the target, an OLPC up-step is initiated. If the transmission is not successfully decoded after for instance three transmissions, the SIR target is increased by e.g. 0.5 dB. For every successfully decoded transmission, the corresponding SIR target is decreased by a factor inversely proportional to the error probability, e.g. about 0.01 dB if the error rate is 2%. The outer loop power control unit 26 here operates according to HARQ (Hybrid Automated Repeat Request).

The maximum target number of transmission attempts is denoted $TA_{max}$, acceptable for a service. Implicitly, $TA_{max}$ sets limits on the area coverage for that service as well, so it will be beneficial to have different $TA_{max}$ for services such as VoIP (Voice over IP) and FTP (File Transfer Protocol). A service cannot be given a higher TA target than $TA_{max}$.

According to the present invention this target is varied by the device 22.

Figure 3:
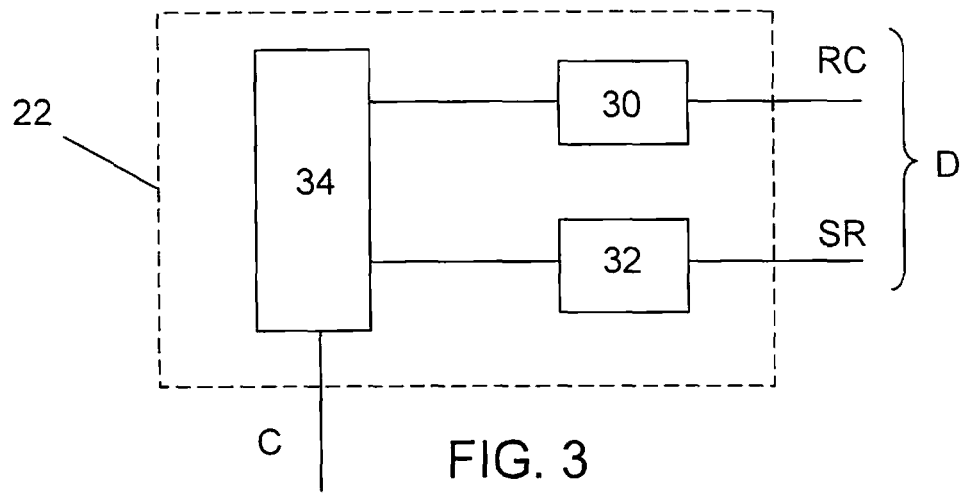
FIG. 3 shows a block schematic of a transmission attempt determining device according to the present invention.

FIG. 3 shows a block schematic of a general structure of the transmission attempt determining device 22 according to the present invention. It includes a radio condition measurement obtaining unit 30 receiving measurement data RC of the radio conditions of the uplinks between the mobile stations and the cell and a service requirement obtaining unit 32 receiving service requirement data SR for the mobile stations of the cell. The measurement data can be obtained from both the mobile stations and the base station. The data D in FIG. 2 is thus made of the radio condition data RC and the service requirement data SR. Finally there is a transmission attempt determining unit 34, which receives the different types of data RC and SR and determines a control signal C that indicates a determined targeted number of attempts or a change of the determined targeted number of attempts that is to be supplied to the outer-loop power control unit for the base station.

Figure 4:
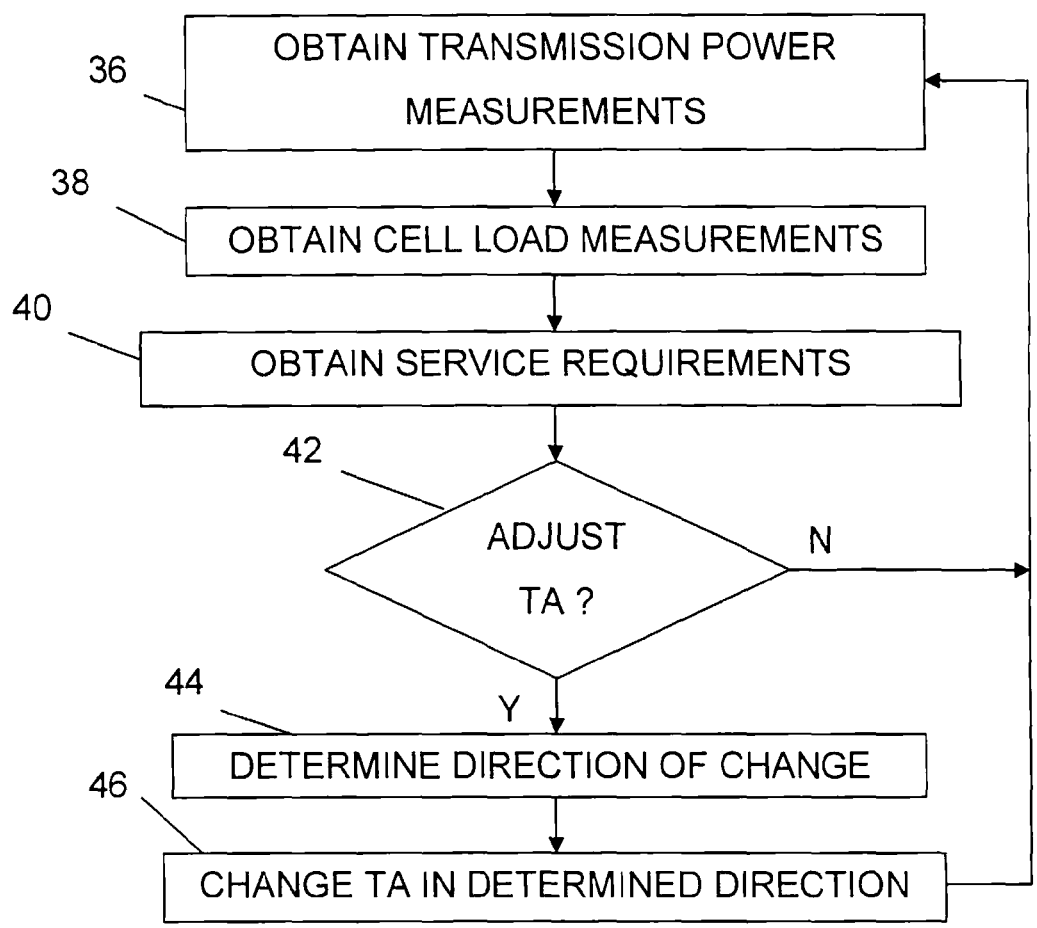
FIG. 4 shows a flow chart of a number of general method steps taken according to the present invention in order to adjust the targeted number of transmission attempts

Now will follow a first general description of the operation of the transmission attempt determining device with reference being made to FIGS. 3 and 4, where the latter shows a flow chart of a number of general method steps taken according to the present invention in order to adjust the targeted number of transmission attempts.

The radio condition measurement obtaining unit 30 of the transmission attempt determining device 22 first obtains radio condition measurement data. This data is normally transmission power data, i.e. transmission power used by a mobile station, and here in the form of code power measurement data, step 36, that is obtained either from the mobile station or the base station. This step is optional and as an alternative to code power it is also possible to obtain other types of transmission power data, for instance measurements of the power headroom, i.e. the remaining power left to use in the mobile station. Other types of data that can be measured are the timing advance data. Thereafter it obtains radio condition measurement data in the form of cell load measurements, step 38, which are typically uplink interference measurements. The service requirement obtaining unit 32 obtains service requirements of the mobile stations. This may include data about required delay and/or required bit rate, i.e. a desired throughput. The data from both these units are then forwarded to the transmission attempt determining unit 34, which goes on and decides if the transmission attempt target, in the following also denoted target TA, is to be adjusted or not, step 42, and if this is not the case the power control functionality of the base station is informed that no change is to be made. Thereafter the transmission attempt determining unit 34 returns and obtains new radio condition measurement data, step 36, and service requirement data (if this has changed), step 38. If however the unit 34 determines that a change should be made, step 42, it then determines the direction of change, i.e. if there is to be an increase or a decrease, step 44. When this has been done the new value or possibly an offset for the pre-set target is supplied as a signal C to the power control functionality of the base station, and here to the outer-loop power control unit, step 46. Thereafter the power control unit may adapt the TA target set according to HARQ with the change provided by the control signal C in order to obtain the desired link quality.

Furthermore, to optimize the system performance when handling delay sensitive users, a minimum transmission attempt target could be defined ($TA_{min}$), since it at some point may be suboptimal to reduce the delay further.

A decision to increase the target TA may here be based on facts like if a mobile station has many consecutive transmission blocks that require more transmission attempts than the original target TA, or the mobile station does not utilize the provided grant (bit rate), or that the used transmission block size given a high uplink interference is unfavourable.

A decision to decrease the target may be based on facts like that a mobile station uses a large transmission block size and asks for more, while the system has spare resources, for instance because of low uplink interference. It may also be based on a temporary increase in SIR or based on trial and error.

In this way it is possible to adjust the transmission targets TA for the cell. Such targets may be determined on a mobile station to mobile station basis, i.e. independently for each mobile station communicating with the cell. However it is also possible to determine a total value for all mobile devices of the cell as well as for different groups of mobile stations. When this is done for different groups, mobile stations may for instance be grouped according to service requirements so that mobile stations having for instance a requirement of limited delay are in one group, while mobile stations having less severe delay requirements, like chatting services are in another group, while messaging or file transfer having virtually no delay requirements may be in a third group. It is also possible to apply the same principles for bit rate requirements as well as to combine these. File transfer do for instance have a high bit rate requirement, while semi-interactive services like chat has a more limited bit rate requirement. In this way it is possible to provide differentiated targets for different groups and in this way the efficiency of the whole cell may be raised. Other ways to use the present invention is to have different targets per service, per cell or per system.

Figure 5:
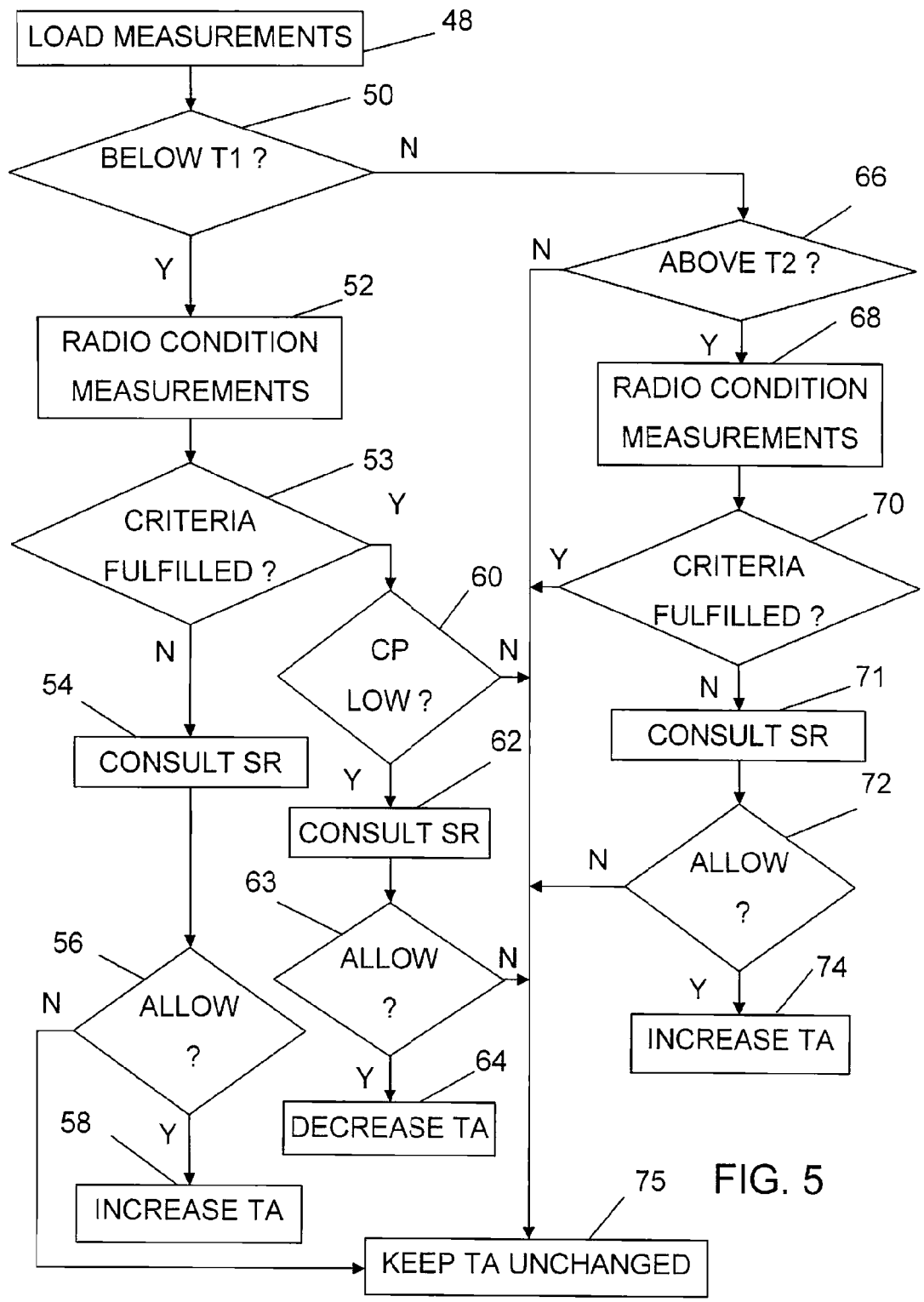
FIG. 5 shows a flow chart of a number of method steps taken according to a first variation of the present invention in order to adjust the targeted number of transmission attempts.

Now a version of the method that is more suitable when determining transmission attempt targets when a low delay is a major concern will be described with reference also being made to FIG. 5, which shows a flow chart of a number of method steps taken according to a first variation of the present invention in order to adjust the targeted number of transmission attempts in the target TA.

Also this method may be applied singly or jointly for a group of mobile stations, where the group may include all mobile stations or just some, for instance the ones having a requirement of a small delay. In the description below focus will be on a single mobile station.

The radio condition measurement obtaining unit 30 of the transmission attempt determining device 22 first obtains radio condition measurements in the form of load measurements, step 48, which are normally measurements on the uplink interference. These are then compared by the transmission attempt determining unit 34, with a first low load threshold T1. If the interference is below this threshold T1, step 50, which indicates that the interference is low, the transmission attempt determining unit 24 then obtains further radio condition measurements from the radio condition measurement obtaining unit 30, step 52. These measurements include measurements relating to transmission power in the form of code power CP, the signal to carrier interference (SIR) target and the path gain. The transmission attempt determining unit 34 then compares these measurements with certain criteria indicative of acceptable radio conditions. These criteria are not fulfilled if the code power is above a first code power threshold, which threshold indicates a high code power, if the power does not meet the signal to carrier interference (SIR) target or if the path gain is bad. A high code power here indicates that the mobile station may be located close to the edge of the cell. An alternative to investigating code power is the power headroom. It is furthermore also possible to investigate timing advance for determining if a mobile station is close to the edge of a cell. Other ways to determine if a mobile station is close to the edge of a cell are through obtaining position data associated with positioning units in the mobile stations, like GPS units, or through triangulation via a number of base stations. When the criteria are not fulfilled, step 53, for the cases of a high code power, inability to meet SIR or a bad path gain, a possible increase of the TA target is contemplated. However, before this can be implemented it has to be determined if the service requirements allow such an increase, for instance for VoIP applications. An increase of the target will lead to a higher delay, which might not be allowed. Therefore the transmission attempt determining unit 34 obtains the service requirements via the service requirement obtaining unit 32 and consults them, step 54. If the service requirements allow it, step 56, an increase in the target TA is made, step 58. If an increase is not allowed, step 56, the target TA is kept unchanged, step 75.

If the criteria were not fulfilled, step 53, an investigation is made if the code power is below a second lower code power threshold. The second code power threshold indicates that low power is used and that the mobile station 16 should be close to the base station 10. Also here timing advance and power headroom is an alternative to code power. Therefore, when on the other hand the comparison of the code power CP with the second code power threshold indicates that the code power CP is above the second threshold, step 60, there is also no change in the TA target, step 75, while if it is below the second threshold, step 60, this indicates that the mobile station 16 should be close to the base station 10 and that the target may be lowered. If the code power was low, step 60, the service requirements are again considered, step 62, and if they allow it, step 63, the target is decreased, step 64, while if they do not allow it, step 63, the target is kept unchanged, step 75. Instead of or in addition to consulting the service requirements in step 62, it is possible to compare the contemplated target decrease with a minimum target value and refrain from decreasing the target if it will end up below this minimum target value.

If the load was not below the first load threshold, step 50, it is compared with a second high load threshold T2, which indicates a high load. If the load on the cell was not above this second threshold, step 66, then the target is kept unchanged, step 75. If however, the load was above the threshold T2, step 66, then once again further radio condition measurements are obtained, step 68. These measurements as before include measurements relating to code power CP, the signal to carrier interference (SIR) target and the path gain. These are then compared with the same radio condition criteria as mentioned before. If the criteria are fulfilled, step 70, then the target is kept unchanged, step 75, while If the criteria were not fulfilled, step 70, an increase in the target is considered. However, before this is done the service requirements are again consulted, step 71. If the service requirements allow it, step 72, an increase in the target TA is made, step 74. If an increase was not allowed, step 72, the target TA is kept unchanged, step 75.

The above mentioned steps may then be repeated continuously for the cell.

The above mentioned method may with advantage be applied for mobile stations requesting services that have low delay requirements, such as VoIP services.

Figure 6:
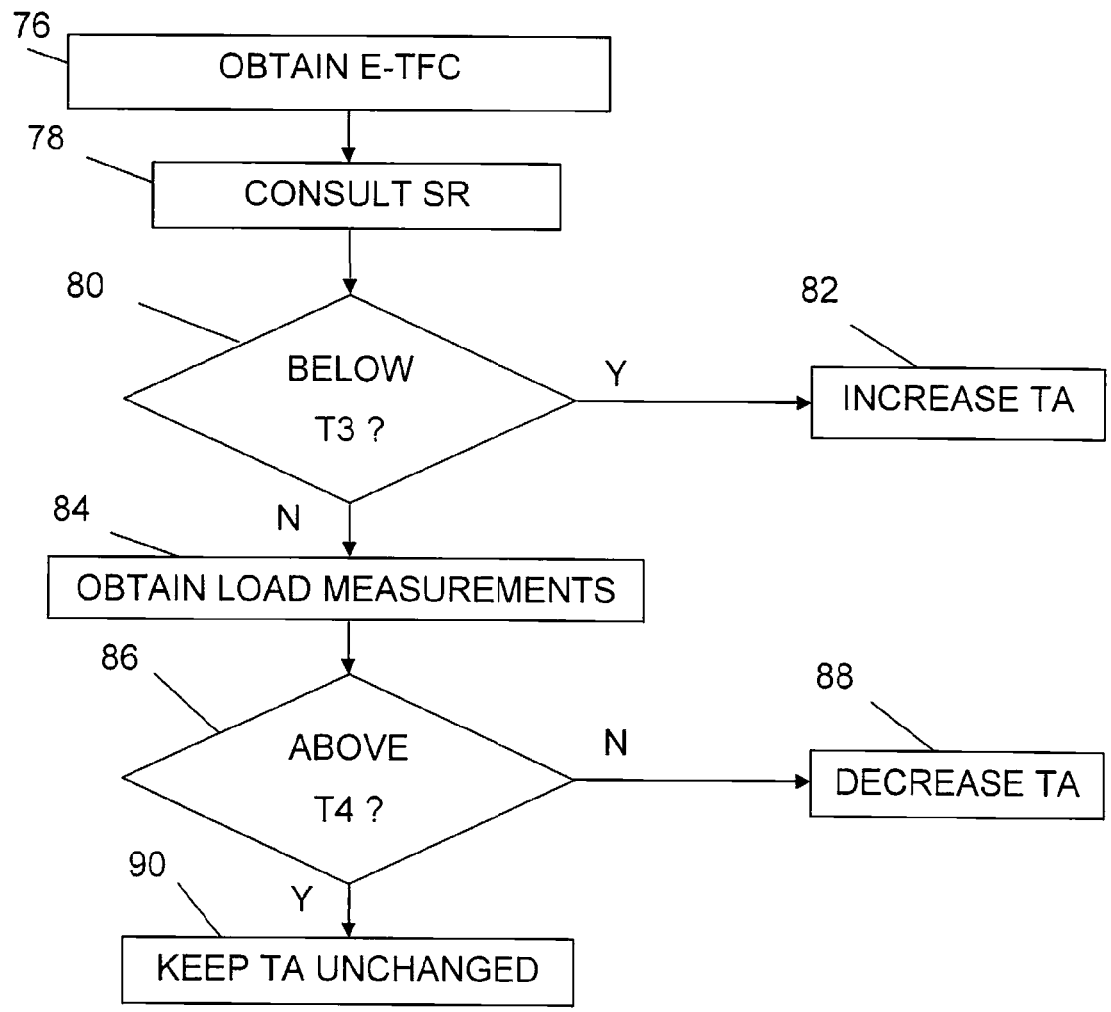
FIG. 6 shows a flow chart of a number of method steps taken according to a second variation of the present invention in order to adjust the targeted number of transmission attempts.

Now a version of the method that is more suitable when determining transmission attempt targets when a high bit rate or high throughput is a major concern will be described with reference being made to FIG. 6, which shows a flow chart of a number of method steps taken according to a second variation of the present invention in order to adjust the targeted number of transmission attempts. It should however be realised that this variation may also be used where delay is an issue.

In the method a desired TA target and a maximum TA target are set, while uplink interference and used E-TFC are monitored. E-TFC (E-DCH Transport Format Combination) in essence provides a measure of a selection by a mobile station of the amount of data that is to be transmitted within a certain time interval with the transmit power that is available.

The method starts with the obtaining of information relating to the E-TFC from a mobile station, step 76, which is thus a measure of the data block size. E-TFC can also be seen as a transmission block size related value. Thereafter the service requirements are consulted, step 78, and here the bit rate requirements possibly together with the delay requirements. These requirements together with the current TA target gives a minimum required E-TFC which is needed to fulfil the bit rate requirement. Thereafter it is investigated if the E-TFC is below a third threshold T3, step 80. This threshold is here set such that the threshold is exceeded only for the maximum E-TFC. If the threshold is not exceeded, step 80, the TA value is increased, step 82, while if it is exceeded, step 80, load measurements are obtained, step 84, normally in the form of uplink interference measurements. The load measurements are then compared with a load threshold T4, which is set to a maximum interference. If this threshold T4 is then not exceeded, step 86, the TA target is decreased, step 88, while if the threshold is exceeded, the target TA is kept unchanged, step 90.

The second described variation of the present invention may with advantage be combined with the first described variation in that the first variation is used mainly for mobile stations having delay limitations, for instance when they use VoIP services, while the second variation is provided mainly for mobile stations having certain bit rate requirements. When this is done the investigation regarding the requirement for a minimum E-TFC may be omitted in the second variation.

The present invention has many advantages. It adapts the targeted number of transmission attempts based on the load on a cell, the service requirements as well as the location of a mobile station within the cell. In this way a better compromise is reached between the desire of the user (mobile station) and the restrictions of the network. It therefore increases user throughput by adopting to low delay primarily for a user close to a base station, it increases system capacity and stability when users are far away from the base station, i.e. it does not waste system capacity by providing unnecessary and/or ineffective low delay to cell-border users, it increases the system capacity for low bit rate services (e.g. VoIP) due to adopting the SIR-target change to the service requirements and it increases the system capacity on a long term by adapting the E-DPDCH (E-DCH Dedicated Physical Data Channel) power offset to the user and cell situation.

The transmission attempt determining device according to the present invention can be implemented through one or more processors together with computer program code for performing the functions of the invention. The program code mentioned above may also be provided as a computer program product, for instance in the form of a data carrier carrying computer program code for performing the method according to the present invention when being loaded into a computer. The transmission attempt determining device may furthermore be provided as a separate device or as a part of another entity in the network, such as a part of a communication control device, such as a base station or a radio network controller. The control signal mentioned above is not limited to be provided to an outer loop-control unit, but can be supplied to any power control unit where transmission attempts are made.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the present invention is only to be limited by the following claims.

The invention claimed is:

1. A method of adjusting a targeted number of transmission attempts in uplink communications between a group of mobile stations and a cell in a wireless network, comprising:
   obtaining measurement data of radio conditions of uplinks between mobile stations in the group and the cell;
   obtaining service requirement data for mobile stations in the group;
   determining, based on obtained data, whether to adjust the targeted number of transmission attempts that can be made by mobile stations in the group in order to obtain a desired link quality for each uplink; and
   if it is determined to adjust the targeted number, determining based on the obtained data whether to increase or to decrease the targeted number, and adjusting the targeted number accordingly.

2. The method of claim 1, wherein obtaining measurement data comprises obtaining data indicative of a load on the cell.

3. The method of claim 1, wherein whether to adjust the targeted number is determined separately for each mobile station of the at least one first group.

4. The method of claim 1, wherein whether to adjust the targeted number is determined jointly for all mobile stations in the group.

5. The method of claim 1, wherein a service requirement for the group comprises a maximum delay.

6. The method of claim 5, wherein the radio conditions include transmission power, and a decrease of the targeted number is determined if the measurement data of transmission power is below a lower transmission power threshold and if a load on the cell is below a low-load threshold.

7. The method of claim 6, wherein the measurement data of the radio conditions are compared with criteria indicative of acceptable radio conditions, and an increase of the targeted number is determined if allowed by a delay requirement and if the load is below the low-load threshold or above a high-load threshold.

8. The method of claim 1, wherein a service requirement for the group comprises a required bit rate.

9. The method of claim 8, wherein the measurement data comprises a value related to transmission block size.

10. The method of claim 9, wherein an increase of the targeted number is determined if the value related to transmission block size is below a maximum level.

11. The method of claim 9, wherein a decrease of the targeted number is determined if the value related to transmission block size equals a maximum level and if a load on the cell is below a load threshold.

12. A device for determining transmission attempts to a cell in a wireless network from a group of mobile stations, comprising:
   a radio measurement unit configured to obtain measurement data of radio conditions of uplinks between mobile stations of the group and the cell;
   a service requirement unit configured to obtain service requirement data for mobile stations of the group; and
   a transmission attempt unit configured to determine, based on obtained data, whether to adjust a targeted number of transmission attempts that can be made by mobile stations in the group in order to obtain desired link qualities for the uplinks; if it is determined to adjust the targeted number, to determine, based on the obtained data, whether to increase or to decrease the targeted number; and to supply a control signal indicative of an adjusted targeted number.

13. The device of claim 12, wherein the device is included in a communication control device.

14. The device of claim 13, wherein the communication control device is a cell handling device.

15. The device of claim 13, wherein the communication control device is a radio network controller.

* * * * *

UNITED STATES PATENT AND TRADEMARK OFFICE
CERTIFICATE OF CORRECTION

| | | |
|---|---|---|
| PATENT NO. | : 8,045,994 B2 | Page 1 of 1 |
| APPLICATION NO. | : 12/514006 | |
| DATED | : October 25, 2011 | |
| INVENTOR(S) | : Ericson et al. | |

It is certified that error appears in the above-identified patent and that said Letters Patent is hereby corrected as shown below:

In Column 3, Line 65, delete "stations," and insert -- stations. --, therefor.

Signed and Sealed this
Fifteenth Day of May, 2012

David J. Kappos
*Director of the United States Patent and Trademark Office*